Jan. 30, 1968   J. E. MESSNER   3,365,929
HAND-HELD SHOCK TESTER
Filed May 21, 1965   2 Sheets-Sheet 1
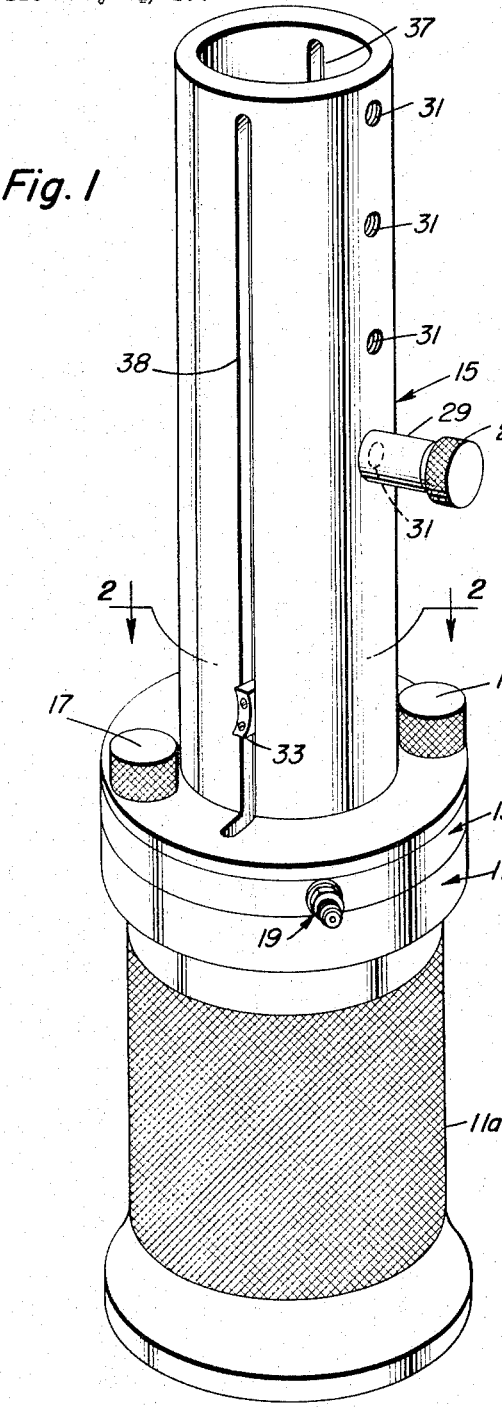
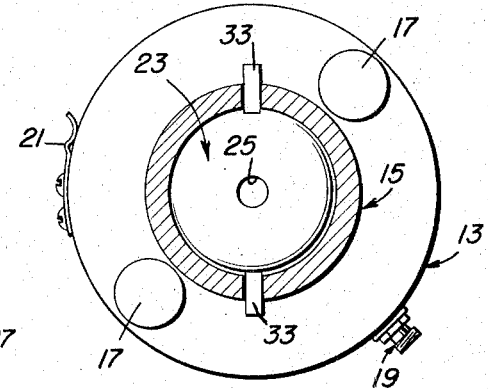
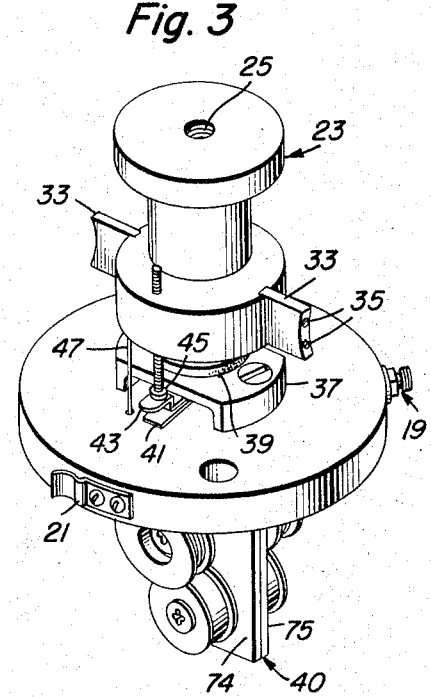
INVENTOR
John E. Messner
BY
ATTORNEY

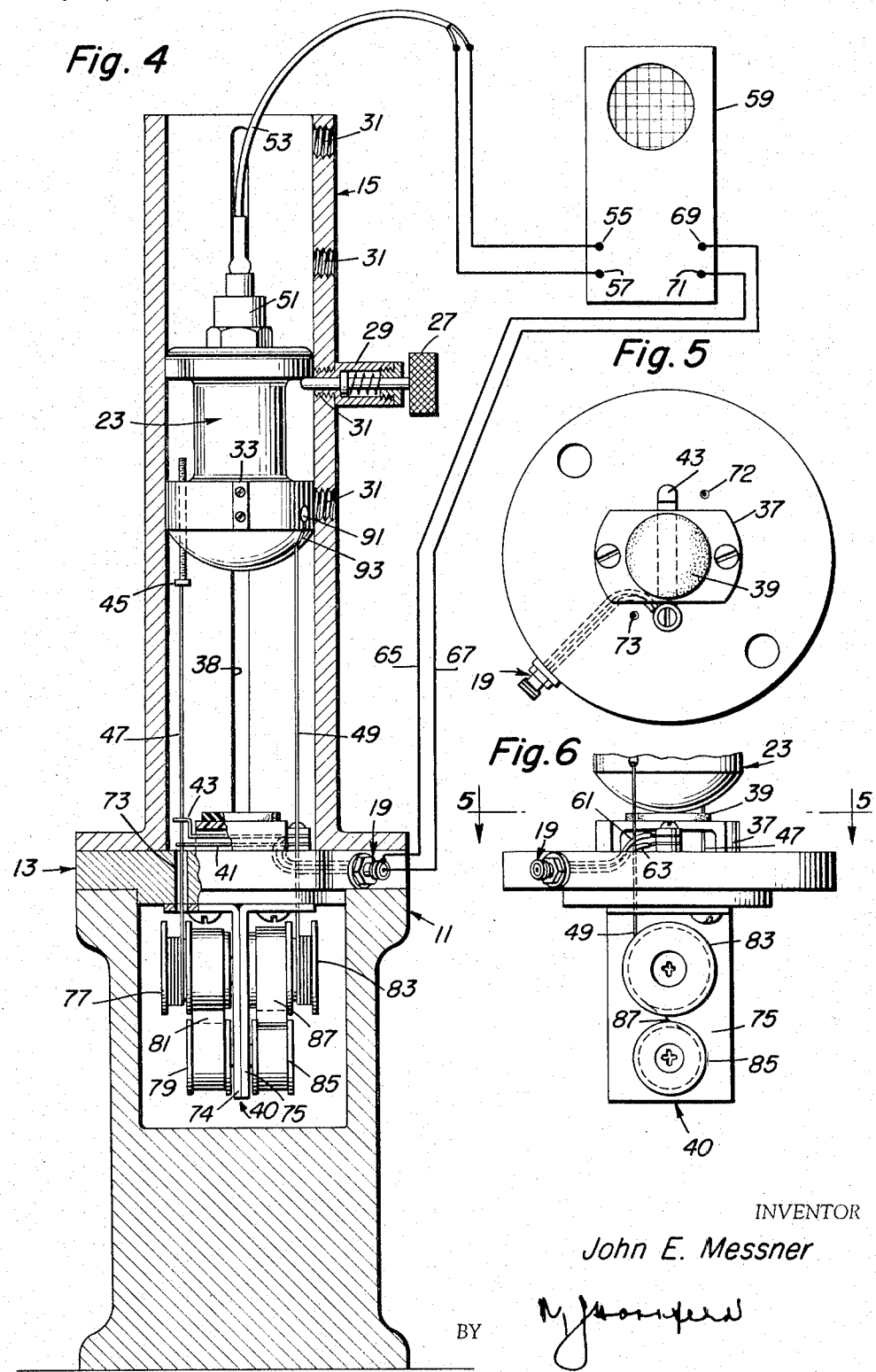

United States Patent Office 3,365,929
Patented Jan. 30, 1968

3,365,929
HAND-HELD SHOCK TESTER
John E. Messner, Ellicott City, Md., assignor to the United States of America as represented by the Secretary of the Navy
Filed May 21, 1965, Ser. No. 457,877
10 Claims. (Cl. 73—12)

ABSTRACT OF THE DISCLOSURE

A shock tester for dynamically testing shock transducers in field operations including a constant force spring loaded hand set impact member adapted to strike an anvil to produce a shock wave against a transducer to be tested. A switch is provided for use with an oscilloscope that is operated just before impact thus, the waves seen on the oscilloscope are those which are generated by the impact, not preliminary vibrations.

The invention described herein may be manufactured and used by or for the Government of the United States of America for governmental purposes without the payment of any royalties thereon or therefor.

This invention relates generally to an impact shock testing device and more particularly to a portable impact shock tester which is portable and small enough to be hand held.

A shock tester of this invention was developed to provide a simple apparatus for dynamically testing shock transducers in field operations where conventional shock testers were either unavailable or their use was impractical. The unique shock tester of this invention has proved versatile enough to be used in the laboratory as well as in the field. The portable shock tester of this invention is less than one foot long, the diameter of the base portion is approximately two inches, and weighs approximately five pounds. For 25 gram payloads the tester produces shock pulses ranging from 400 to 1000 g peak with durations of approximately one millisecond and velocity changes up to fifteen feet per second. The tester as developed has been used principally for checking the output of the piezo-electric accelerometers immediately prior to field use. The base of the shock tester of this invention may be machined from a heavy metal such as brass and provides an anvil or reaction mass to absorb the impact of the test carriage. An aluminum mounting plate is provided for holding the shock pad and mounting spring motors which provide the acceleration forces for the test carriage. A barrel or cylinder is provided for guiding the movement of the test carriage to the shock pad. Slots are provided in the barrel through which finger grips or lugs protrude from the transducer test carriage. The barrel also has tapped holes to adapt the release mechanism such that the test carriage may be operated at various drop heights. The test carriage made from Teflon, a material with a high built in damping coefficient, is provided with a bottom that is hemispherically curved to give a desired pulse shape. The finger grips or lugs extending from the carriage to the outer side of the barrel provide for raising or lowering the carriage and maintaining alignment. The piezo-electric accelerometers are connected to an oscilloscope for indicating the shock pulse. Spring motors provide the accelerating force for the test carriage. An impact device or shock pad is made from two separate parts bonded together with an adhesive. One part is made from nylon plastic in the shape of a bridge, and the other is made from a resilient material such as rubber. The shock pad is instrumental in producing the proper pulse shape.

An object of this invention is to provide an impact shock testing device for testing piezo-electric type accelerometers.

Another object of this invention is to provide a portable shock tester which may be hand carried and hand held during impact tests.

A further object of this invention is to provide a portable hand held impact shock tester for piezo-electric accelerometers with a built in reaction mass.

A still further object of this invention is to provide a lightweight portable shock tester in which the shock parameters are repeatable within 1%.

Another object of this invention is to provide a hand-held shock tester employing spring motors for accelerating the test carriage.

It is yet a further object of this invention to provide a shock tester of hand tool size which is designed to be used as such.

Other objects and many of the attendant advantages of this invention will readily be appreciated as the same becomes better understood by reference to the following detailed description when considered in connection with the accompanying drawings in which like reference numerals designate like parts throughout the figures thereof and wherein:

FIG. 1 illustrates an external view of the shock tester of this invention;

FIG. 2 illustrates a cross sectional view of the barrel portion of the shock tester of this invention;

FIG. 3 illustrates a view of the shock test assembly of the shock tester of the instant invention;

FIG. 4 illustrates a cross sectional view of the shock tester of this invention;

FIG. 5 illustrates a plan view of the mounting plate of this invention showing the shock pad and rubber cushion mounting; and FIG. 6 illustrates the mounting plate, the spring motor mounting and the shock pad.

Referring now to FIG. 1 of the drawings, the hand-held shock tester can be seen in its entirety having a base or anvil portion 11, a mounting plate 13 and a barrel or cylinder portion 15. Mounting plate 13 and barrel assembly 15 are fixedly fastened to base member 11 by threaded bolt members 17. Threaded bolt members 17 are threadedly engaged in threaded holes in the base member 11. The mounting plate is provided with an electrical outlet receptacle 19 and a clip 21 for holding a cable. The test or transducer carriage 23 is shown in FIGS. 2 and 3 of the drawings having a threaded hole 25 for mounting a transducer to be tested. A spring loaded pin assembly is shown having a pin 27 with the threaded knurled head portion and a collar portion 29. The collar portion 29 is threadedly mounted into any of the threaded holes 31. The carriage may be provided with lugs 33 which may be inset into the body of carriage 23 and are provided with mounting holes 35 therein through which lugs or finger grips 33 may be fixedly attached by bolts or other fastening means to the main body portion of carriage 23. The barrel or sleeve 15 is also provided with slots 38 which run substantially the length of the barrel and provide openings through which lugs 33 project. The projection of lugs 33 through slots 38 to the outer portion of the barrel provide for resetting the transducer carriage to a starting position.

The shock vehicle assembly as shown in FIG. 3 comprises the mounting plate 13, test carriage 23, shock pad 37, rubber cushion 39, and constant force spring motor assembly 40. The shock vehicle assembly additionally includes a pair of trigger contacts 41 and 43 which are closed at a predetermined time before the test carriage strikes cushion 39 and the shock pad 37. The time at which contacts 41 and 43 are closed is determined by the setting of set screw 45 which is threadedly mounted within the test carriage 23. The transducer carriage 23 is connected to the spring motors by cords or tow cables 47 and 49 which may be made of a nylon material. The base or anvil 11 may be provided with a knurled portion 11a for a better grasp when the device is to be hand held.

Referring now to FIGS. 4, 5 and 6 of the drawings, the transducer test carriage 23 is shown in the loaded or pretest position with releasable pin 27 locking the test carriage in position. Cords or tow cables 47 and 49 are shown partially extended or unwound from the spools of the spring motors. Holes 72 and 73 are provided in mounting plate 13 for cords 47 and 49 to pass through. A transducer element 51 which is to be tested is shown mounted on the top of the test carriage 23. Electrical contacts 41 and 43 are connected to the electrical outlet receptacle 19 through wires 61 and 63 which run through the mounting plate 13. The electrical outlet receptacle 19 is shown schematically connected to conductors 65 and 67 which connect to terminals 69 and 71 of oscilloscope 59.

The spring motor assembly 40 is mounted on a pair of mounting brackets 74 and 75 which are arranged in a back-to-back relationship and bolted or otherwise fastened to the underside of mounting plate 13. A first spring motor unit comprises spools 77 and 79 each of which are rotatably mounted on mounting bracket 74. Spool 77 is divided into two portions, the first portion of which is used to take up nylon cord 47. The second portion of spool 77 is used as a take up spool by the spring tape material 81 of the spring motor. Spool 79 acts as a take up spool for the spring tape 81 of the first spring motor. The second spring motor is comprised of spools 83 and 85. The spool 83 is divided into two portions, one portion of which is used as a take up spool for nylon cord or tow cable 49 and the other of which is used as a take up spool for spring tape 87 of the second spring motor. Spools 83 and 85 are rotatably mounted on the brackets 75 and are coaxial with spools 77 and 79, respectively. Spring motors are a constant force type and in the particular embodiment shown the rated load is approximately 6 ounces each. The spring motors may be commercially available spring motors known in the art as "Neg'ator," Model P7172, manufactured by the Hunter Spring Co., a division of Amtec Inc., Hatfield, Pennsylvania. Each of these motors have a constant force range of about 6 ounces over their full travel of three feet, and endurance of 3000 cycles, and have a .020 inch diameter nylon cord or tow cable. Nylon cord 49 is removably connected to transducer carriage 23 by means of a horizontal hole 91 and a communicating vertical slot 93 as shown in FIG. 4 in relation to cord 49. Nylon cord 47 is connected to the transducer carriage 23 in an identical manner in a position diametrically opposite the connection of nylon cord 49. The nylon cords are knotted at the end to hold them in place. The knot is small enough to fit within the hole 91 but too big to slide through the slotted portion 93.

Referring now to FIGS. 4, 5 and 6 of the drawings for the operation of the shock tester of this invention the transducer carriage 23 is pulled up into the locked position as shown in FIG. 4 with pin 27 holding the carriage 23 in the cocked or pretest position. Test carriage 23 may be placed in the cocked position raising the lugs 33 which project externally from the barrel 15 as shown in FIGS. 1 and 2 of the drawings. The test transducer 51 may be threadedly mounted in place as shown in FIG. 4 of the drawings and the cable 53 connects the electrical circuit of a transducer to the vertical input terminals of the cathode ray oscilloscope 59. Cathode ray oscilloscope 59 may be of the recording type such that the shock pattern will persist on the screen for observation or photographic recording as may be desired. At this time terminals 41 and 43 are open. Contacts 41 and 43 are connected to the horizontal sweep circuit of oscilloscope 59 and, upon closing act to initiate the horizontal sweep of the oscilloscope 59. When it is desired to test the particular transducer 51 for observation of the test shock pattern, the spring loaded pin 27 is withdrawn from the barrel 15 and the spring motors act to accelerate the test carriage until it strikes the rubber cushion 39 on the shock pad 37. Just before the rounded bottom portion of carriage 23 strikes cushion 39, the set screw 45 will press contact 43 until it touches contact 41 and the horizontal sweep circuit of the cathode ray oscilloscope 59 will be energized. The time at which the sweep circuit is energized may be varied by adjusting the setting of set screw 45. As soon as contacts 41 and 43 are closed, the accelerations or shock pattern may be observed on the oscilloscope. The shock pattern may be recorded or observed and compared with previous shock patterns of similar transducers to determine the characteristics or the acceptability of the particular transducer being tested. During the travel of the carriage from the top position as shown to the bottom position on the mounting pad, the spring motor tapes 81 will unwind from spool 77 and will wind up on spool 79. In a like manner, spring motor tape 87 will unwind from spool 83 and will wind up on spool 85. During this time the tow cables 47 and 49 will wind up on spools 77 and 83 respectively. At the beginning of the travel or as soon as the test carriage is released, a spring force of 5.2 g is applied to the test carriage for a period of approximately 85 to 70 milliseconds depending upon which of the barrel holes 31 is used for the release pin. At the point of impact a shock force of 400 to 1000 g is applied to the transducer and carriage for a time of approximately 1 millisecond duration. The carriage 23 and transducer 51 then rebound with the peak acceleration force of 20 to 50 g. The above data are taken from some observations of apparatus of the particular embodiment of this invention with the spring motors and test carriage as described herein. Larger payloads have been tested with the device or up to 125 grams have been tested with this device without sacrificing quality and repeatability of the shock produced. The shock range for 125 grams will be varied from 200 to 500 g. Cable 53 may be a "Microdot" type cable. A cable clip 21 is provided to hold such a connector. This is a conventional connector used with crystal accelerometers. Other types of connectors or cables can easily be adapted to this type of connector.

The base or hand grip portion of this device may be machined from brass or other heavy metals which provide a heavy backup mass which does not have to be physically large. This feature allows the tester to be operated in a hand-held position or resting on some object without change in its shock output characteristics. Mounting plate 13 may be made of aluminum or other suitable materials. Barrel 15 may also be made from aluminum. Carriage 23 of the embodiment of this invention may be made of "Teflon," a material with high built in damping coefficient and good lubricating qualities.

Obviously many modifications and variations of the present invention are possible in the light of the above teachings. It is therefore to be understood, that within the scope of the appended claims, the invention may be practiced otherwise than as specifically described.

What is claimed as new and desired to be secured by Letters Patent of the United States is:

1. A shock tester for testing transducers comprising,
   a base portion,
   a mounting plate mounted on said base portion,
   a barrel portion mounted on said mounting plate,
   a test carriage slideably mounted within said barrel portion subject to being raised within said barrel portion,
   a release pin on said barrel portion,
   a shock pad mounted on said mounting plate,
   constant force spring means connected to said test carriage for accelerating said test carriage to said shock pad, said test carriage adapted to hold a transducer for testing, and means responsive to the impact of said test carriage and said shock pad to produce an external manisfestation of the shock pattern.

2. A shock tester as in claim 1 in which said shock pad is a nylon bridge member with a rubber cushion mounted thereon.

3. A shock testing device designed to be used as a hand tool comprising, a base portion made of a high density metal and adapted to be used as a reaction mass for the shock tester, a mounting plate, said mounting plate having a shock pad mounted thereon and a constant force spring motor means mounted on the underside of said mounting plate, said mounting plate adapted to the said base portion being hollowed out sufficiently to house said spring motor assembly, a barrel portion mounted on said mounting plate and having diametrically opposed slots running substantially the length of said barrel portion, said barrel portion further having threaded holes disposed along the length thereof for accepting a releasable pin-locking means, a transducer carriage slideably mounted within said barrel portion and having lugs extending outwardly through the slots in said barrel portion whereby said transducer carriage may be moved to various positions within said barrel portion, cord means connected between said spring motor assembly and said transducer carriage whereby an accelerating force may be applied to said transducer carriage, means on said transducer carriage for mounting a transducer to be tested, said transducer carriage having a recessed portion for accepting said releasable locking pin whereby said carriage may be locked in a cocked position and whereby said carriage may be released by releasing said pin to be accelerated to the shock pad to provide a shock of known intensity upon said transducer, means connecting the electrical output circuit of said transducer to an oscilloscope whereby the impact intensity may be measured, a pair of electrical contacts mounted on said mounting plate, means on said test carriage for closing said contacts a selectable predetermined time before said test carriage strikes said shock pad, means connecting said electrical contacts to said oscilloscope whereby the horizontal sweep of said oscilloscope may be actuated prior to the impact of the transducer carriage upon the shock pad.

4. A shock testing device as in claim 3 in which said transducer carriage is made of Teflon.

5. A shock testing device adapted to be used as a hand tool comprising, a base portion, a mounting plate mounted on said base portion, spring motor means mounted on the underside of said mounting plate, a shock pad mounted on the upperside of said mounting plate, a cylinder extending upward from said mounting plate and mounted thereon, an impact carriage device subject to being raised within said cylinder and adapted to be slideable within said cylinder from the top portion of said cylinder to the shock pad, cord means connecting said spring motor means to said impact carriage device whereby said carriage may be accelerated to impact with said shock pad, a releasable locking means for locking said carriage at desired discrete distances from said shock pad whereby desired discrete impacts may be applied to said test carriage, said test carriage adapted to have a transducer mounted thereon, means connecting the output of said transducer to an oscilloscope whereby the impact applied to said transducer may be observed, contact springs mounted on said mounting plate and adapted to be closed by said transducer carriage, means selecting the time that said contacts will close prior to the impact of said test carriage upon said test pad, said contacts being connected to the horizontal sweep circuit of said oscilloscope whereby the horizontal sweep of said oscilloscope may be energized prior to the impact of said transducer carriage upon said shock pad.

6. A shock testing device as in claim 5 in which said cord means is a pair of nylon cables and said spring motor means is a pair of spring motors each connected to a respective one of said nylon cables.

7. A shock testing device adapted to be hand held during the operation thereof comprising, a reaction mass, a shock pad mounted upon said reaction mass, a test carriage subject to being raised relative to said shock pad and adapted to carry a transducer means adapted to be tested for impact shock, means guiding the test carriage in a straight line from a desired distance point to said shock pad, means releasably holding said test carriage at said desired distant point from said shock pad, constant force spring means adapted to apply a constant acceleration force to said test carriage whereby said test carriage will strike said shock pad with a desired impact, means for adjusting the distance that said carriage travels whereby a desired impact shock may be provided, and means responsive to said impacted shock to produce an external manifestation of the shock pattern.

8. A shock testing device as in claim 7 in which said reaction mass is a high density metal material.

9. A shock testing device as in claim 7 in which said guide means is a cylinder mounted on said reaction mass and said test carriage is a Teflon carriage slideably engaging said cylinder.

10. A shock testing device as in claim 7 in which said constant force means is a pair of spring motors.

References Cited
UNITED STATES PATENTS

| | | | |
|---|---|---|---|
| 2,630,704 | 3/1953 | Armstrong | 73—12 |
| 3,106,834 | 10/1963 | Parstorfer | 73—12 |
| 3,266,289 | 8/1966 | Stamy | 73—12 |

RICHARD C. QUEISSER, *Primary Examiner.*

J. J. GILL, *Examiner.*

J. D. SCHNEIDER, *Assistant Examiner.*